United States Patent [19]

Ramirez

[11] Patent Number: 5,782,048
[45] Date of Patent: Jul. 21, 1998

[54] REINFORCED BUILDING STRUCTURE AND METHOD OF CONSTRUCTING THE SAME

[76] Inventor: Jose G. Ramirez, P.O. Box 657, Hidalgo, Tex. 78557

[21] Appl. No.: 805,376

[22] Filed: Feb. 24, 1997

Related U.S. Application Data

[63] Continuation of Ser. No. 499,167, Jul. 7, 1995, abandoned, which is a continuation-in-part of Ser. No. 257,371, Jun. 9, 1994, which is a continuation of Ser. No. 979,137, Nov. 20, 1992, abandoned.

[51] Int. Cl.⁶ .................... E04H 9/14; E02D 27/50
[52] U.S. Cl. .............. 52/295; 52/741.1; 52/293.1; 52/223.7; 52/DIG. 11
[58] Field of Search ............... 52/712, 23, 726.1, 52/DIG. 11, 227, 668, 669, 293.1, 223.7, 266, 271, 270, 741.4, 295

[56] References Cited

U.S. PATENT DOCUMENTS

| | | |
|---|---|---|
| 573,452 | 12/1896 | Delahunt ................. 52/92.2 |
| 1,125,335 | 1/1915 | Jester ....................... 52/712 |
| 1,192,027 | 7/1916 | Acheson . |
| 2,011,018 | 8/1935 | Smith ....................... 52/295 |
| 3,820,293 | 6/1974 | Ohe et al. . |
| 4,726,567 | 2/1988 | Greenberg ................ 52/169.9 |
| 4,817,353 | 4/1989 | Woods et al. ............. 52/295 |
| 5,007,218 | 4/1991 | Bengtson et al. ......... 52/295 |
| 5,186,571 | 2/1993 | Hentzchel ................. 52/712 |
| 5,384,993 | 1/1995 | Phillips .................... 52/92.2 |
| 5,519,977 | 5/1996 | Callahan et al. .......... 52/712 |

FOREIGN PATENT DOCUMENTS

| | | | |
|---|---|---|---|
| 1478268 | 3/1967 | France ..................... 52/712 |
| 2951098 | 6/1980 | Germany .................. 52/712 |

*Primary Examiner*—Darnell M. Boucher
*Attorney, Agent, or Firm*—Miller, Sisson, Chapman & Nash

[57] ABSTRACT

A reinforced building structure having a multiplicity of steel reinforcement rods for reinforcing the wall and the roof of a building and a method for constructing reinforced building structures so they may withstand strong winds. The method involves installing vertical tie rods to bolts anchored in the foundation of the building structure. The rods tie the horizontal beams, such as ceiling joists of the building structure, to the anchor bolts through nuts and washers secured to the removed end of the anchored tie rod.

4 Claims, 15 Drawing Sheets

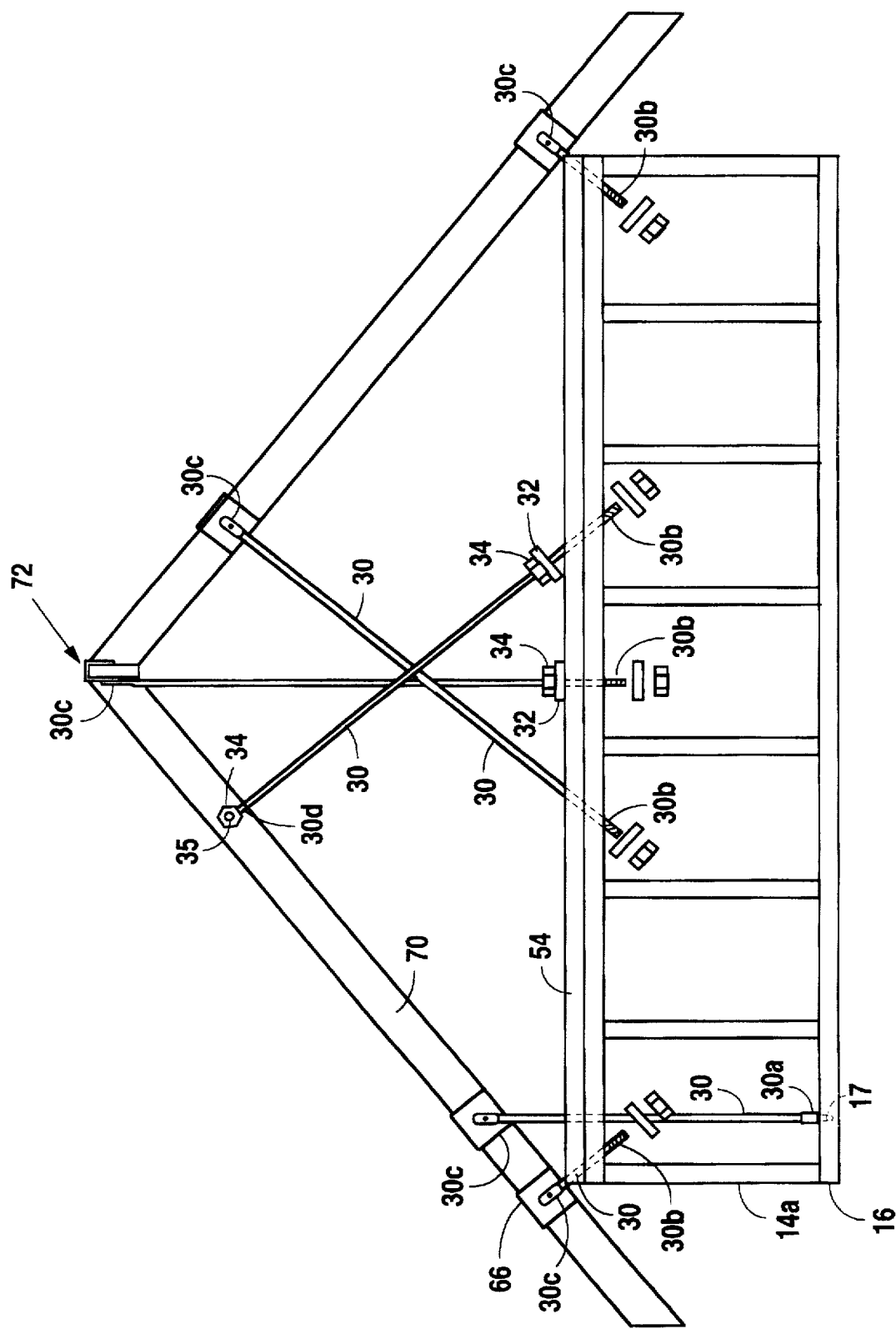

REINFORCED BUILDING STRUCTURE AND METHOD OF CONSTRUCTING THE SAME

This application is a continuation of application Ser. No. 08/499,167, filed Jul. 7, 1995 now abandoned, which is a continuation-in-part of pending U.S. patent application Ser. No. 08/257,371 filed Jun. 9, 1994, which, in turn, is a continuation of abandoned U.S. patent application Ser. No. 07/979,137 filed Nov. 20, 1992.

FIELD OF THE INVENTION

Applicant's invention relates to a reinforced building structure, more particularly reinforced building structure having a multiplicity of steel reinforcement rods for reinforcing the wall and the roof of the building.

BACKGROUND OF THE INVENTION

Storms, hurricanes, typhoons, tornadoes and the like are devastating to building structures. In the United States, wind damage to building structures amounts to millions of dollars each year in losses. Indeed, Hurricane Andrew struck Florida in 1992 and caused damages estimated to be in excess of $100 million to residential homes alone. However, even in the areas of heaviest damages, where wind speeds exceeded 150 knots, certain more stoutly-built structures withstood the winds far better than others.

Much of the wind damage to building structures occurs at a "weak link" of the building structure, that weak link being the juncture of the horizontal beams, such as ceiling joists or the like, with the vertical support structures (either vertical wood posts or concrete blocks). These nail-secured joints, securing one piece of wood to another, are usually effective in preventing shear or compression forces from dislocating the joined pieces of wood. However, if strong winds cause tension forces, the fasteners are less successful and the boards are more apt to separate with significantly less force than that required to separate the boards with shear or compressive forces.

OBJECTS OF THE INVENTION

Applicant provides a means for reinforcement of building structures to better withstand high winds.

Thus, it is the object of the present invention to provide a method of reinforcing building structures by installing means to increase the resistance of beams to separation under tensile forces.

It is a further object of the present invention to provide a primarily wood building structure capable of withstanding winds.

This and other objects are provided for by installing applicant's rigid metal tie rods from the foundation of the building structure to extend vertically upward and through ceiling joists or other horizontal beams, affixing the tie rod to the top surface of the beams (thereby anchoring it to the foundation with a threaded tie rod), as well as to use tie rods to hold the roof together and onto the walls of the building structure.

SUMMARY OF THE INVENTION

Applicant's invention provides a method for reinforcing building structures which have foundations in which anchor bolts are secured. The method provides a multiplicity of rigid, metal tie rods threaded onto the anchor bolt at a first end, the rigid, metal tie rods extending vertically upward within the walls of the building structure and perpendicular to the lintels, horizontal beams and ceiling joists thereof. A washer and nut at the removed end of the tie rods secure them to the top surface of the ceiling joists or other horizontal beams. In this manner, tension forces applied to the secured beams are transmitted through the tie rods to the anchor bolts in the foundation, thus, significantly strengthening the building structure to the forces generated by high winds and the like.

Applicant also provides for these and other objects in a building structure having a multiplicity of vertical metal tie rods attached at a first end to the anchor bolts of the foundation and at a second end, passing through a horizontal beam and secured against the top surface thereof.

Applicant further provides a roof structure reinforced with metal tie rods which secure the roof joists and ridge beam to the remainder of the building structure.

BRIEF DESCRIPTION OF THE DRAWINGS

FIG. 5A is an elevational cutaway view of the system of the present invention for tying the roof into the reinforced building structure.

DETAILED DESCRIPTION OF THE PREFERRED EMBODIMENT

Figure 1A:
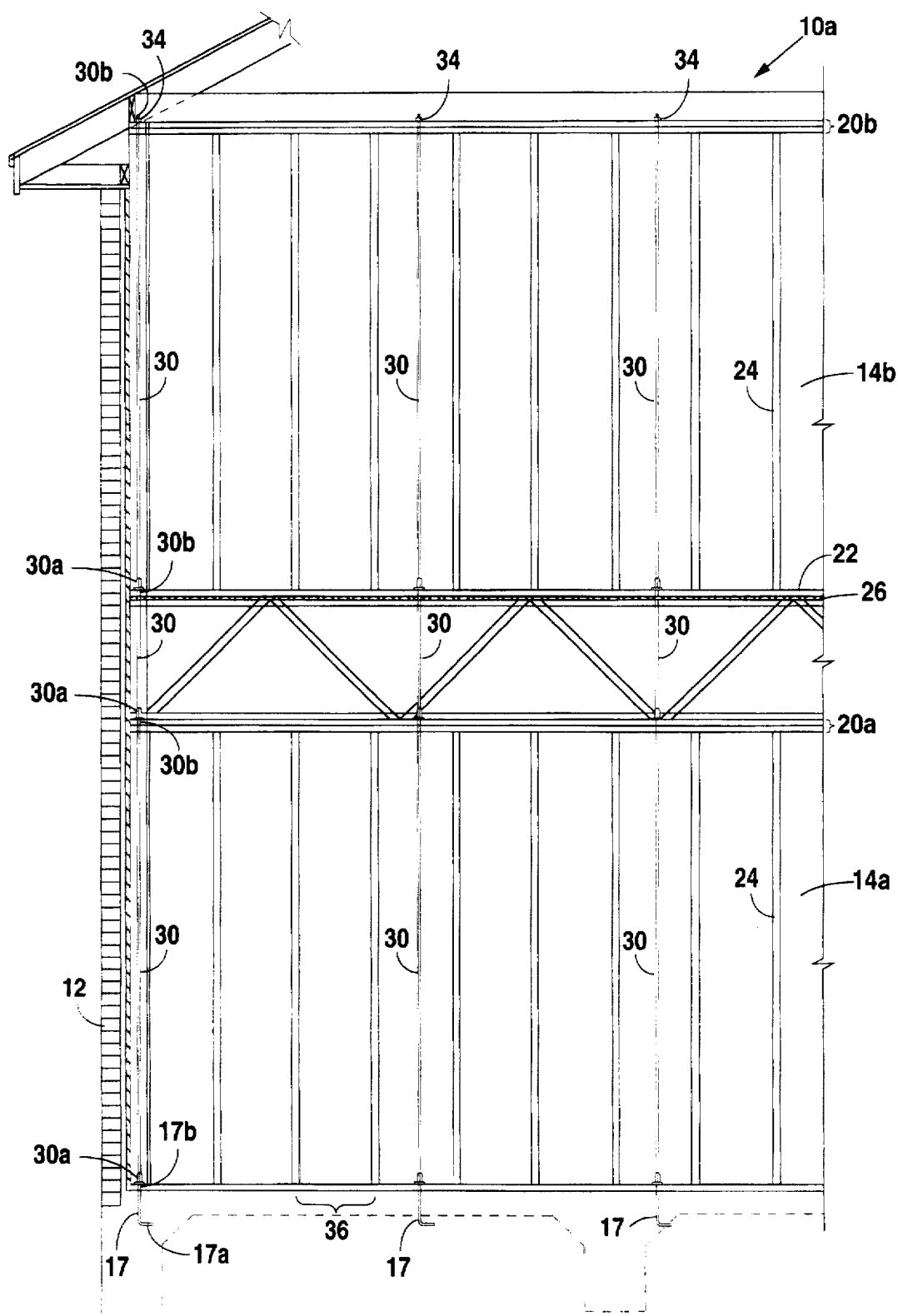
FIG. 1A is a side elevation cut-away view of a typical residence structure.
Figure 1B:
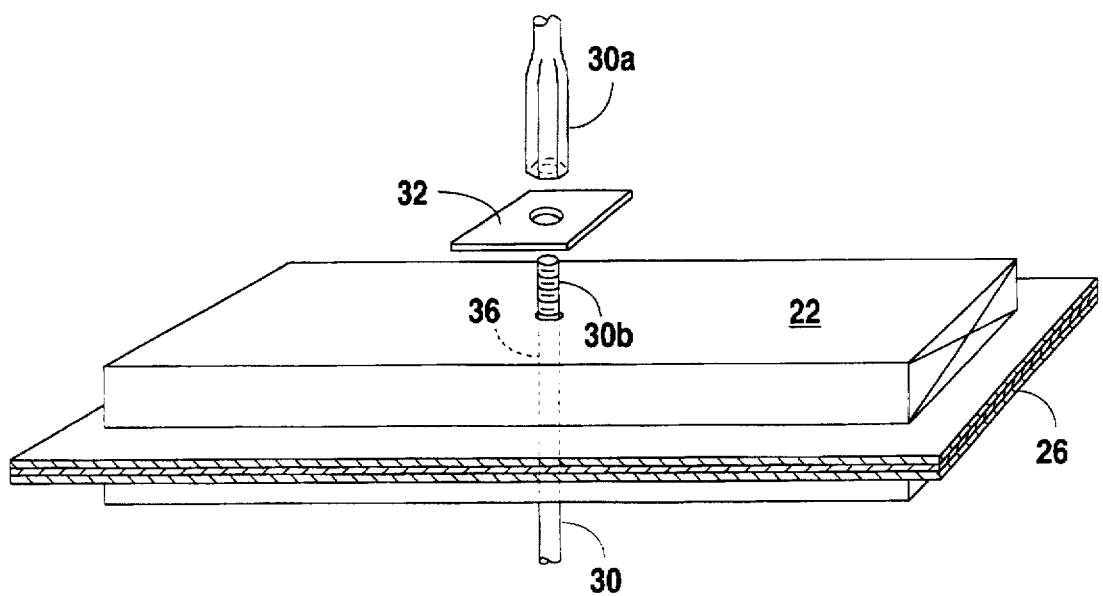
FIGS. 1B and 1C are detailed views of applicant's method of anchoring.
Figure 1C:
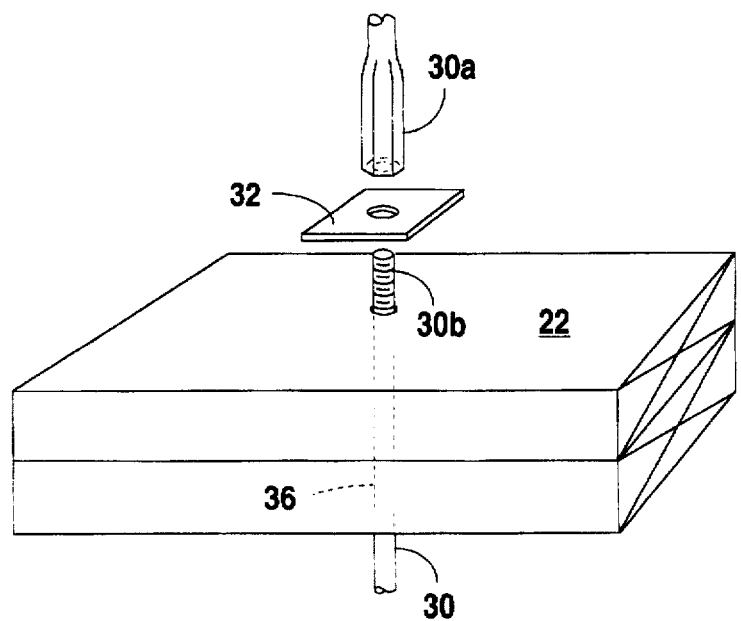
Figure 1D:
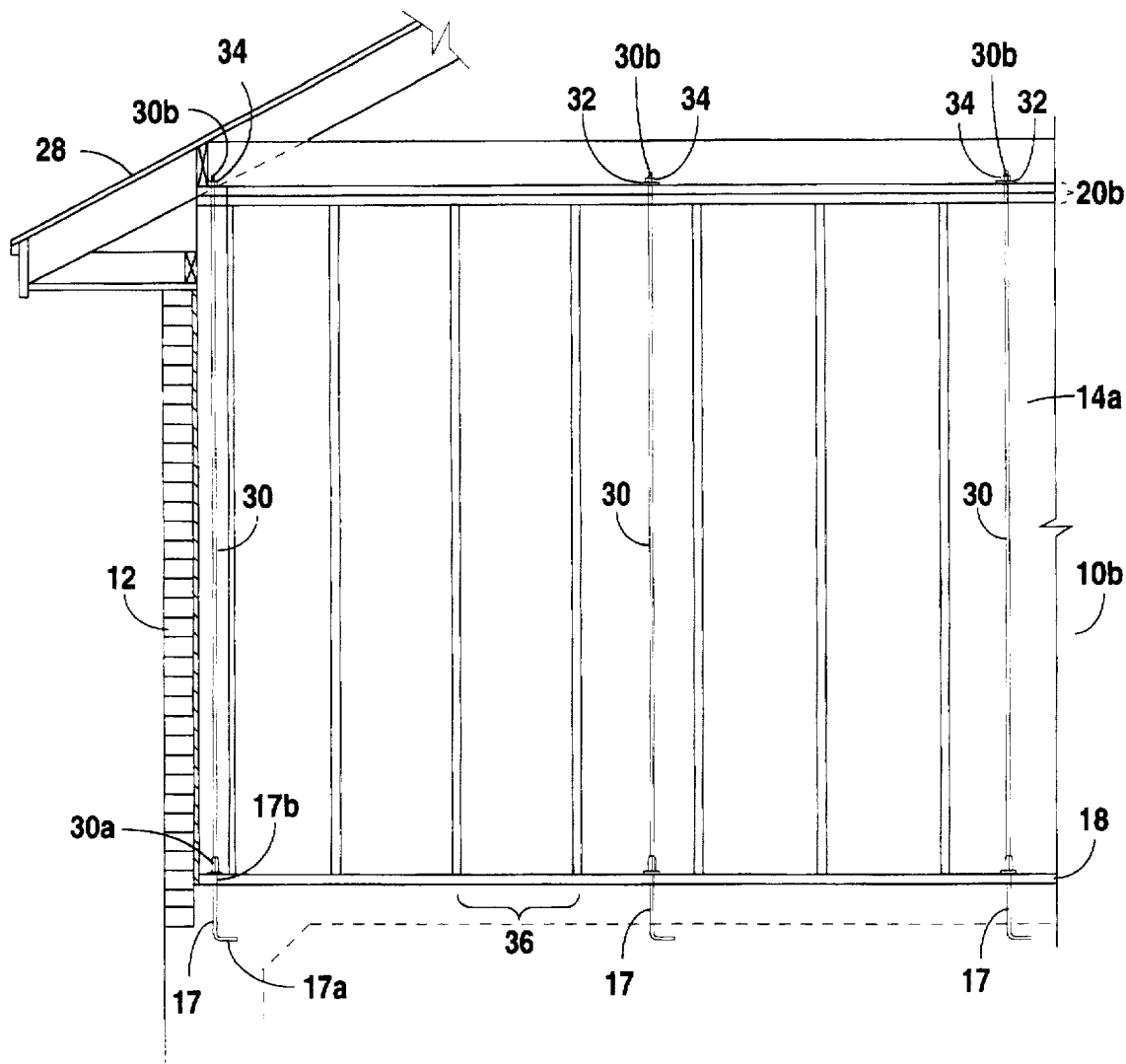
FIG. 1D is an elevational cut-away view of the method of applicant's present invention featuring a typical one-story wooden frame dwelling.

FIGS. 1A–C illustrate the method of the preferred embodiment of the present invention as adapted to a two-story wood frame building (10a) (FIG. 1A) and a one-story wood frame building (10b) (FIG. 1D).

Turning now to buildings (10a) and (10b), general features may be viewed as follows. Typical brick and wood stud wall (12) may be found on both buildings (10a) and (10b). Typical wood stud walls (14a), well known in the art, define a first story of building structures (10a) and (10b). Typical wood stud walls (14b), also well known in the art, define a second story of building structure (10a).

Figure 2A:
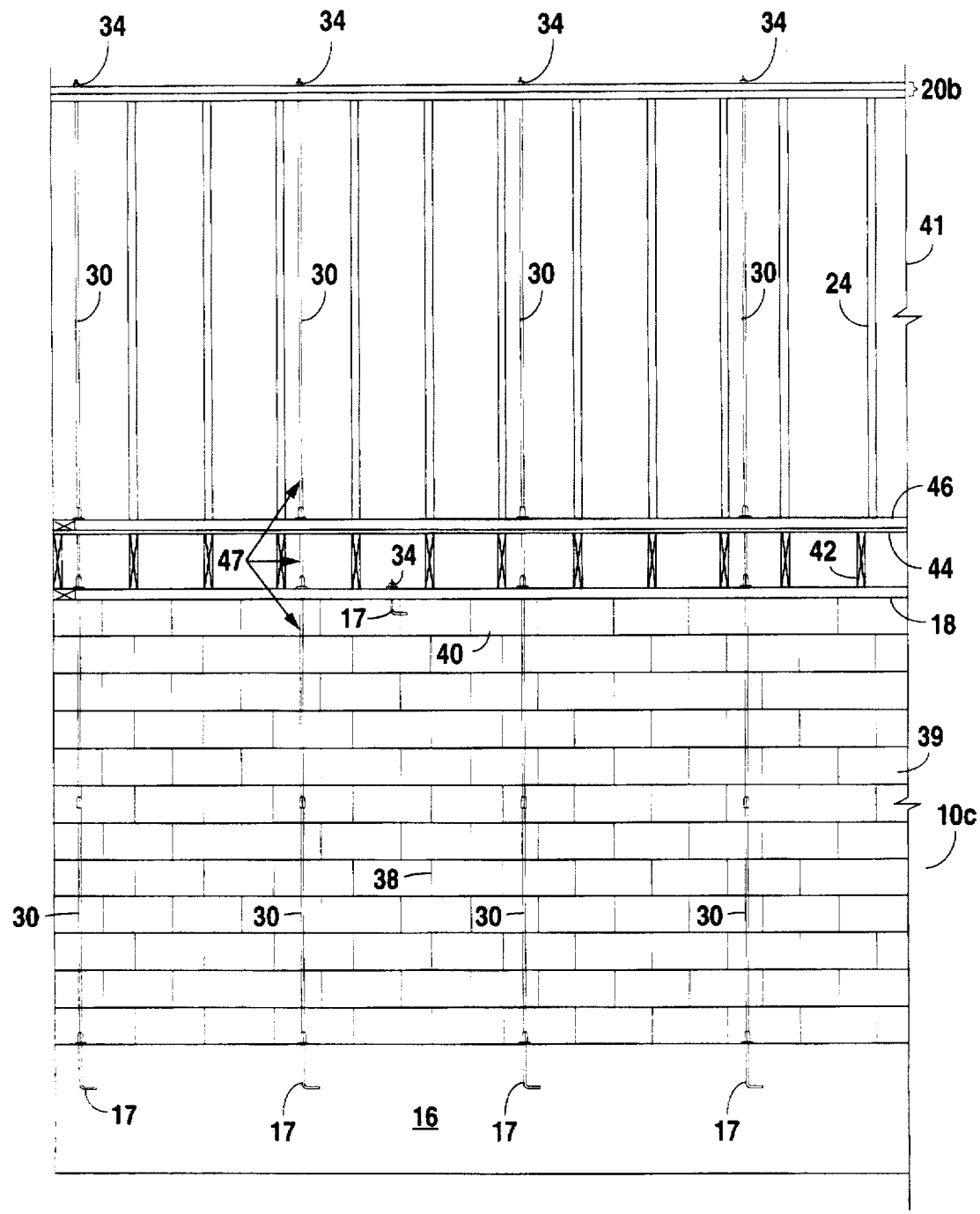
FIG. 2A is a cut-away elevational view of a wall section for a two-story building of a concrete block and wooden frame.

All the building structures, the subject of applicant's present invention, are anchored by foundation (16), typically concrete (see FIG. 2A). As can be seen in FIGS. 1A, 1D, 2B and 2C, anchors studs, generally 2" by 4", are secured to the top surface of concrete foundation (16) with anchor bolt (17). Anchor bolt (17) can be seen to have an anchored end (17a) and a threaded end (17b) (See, also, FIG. 3C).

Turning to FIG. 1A, it is noted that at the top of first floor stud walls (14a) are found first floor ceiling joists (20a). If a second story building utilizes the present method then, second floor ceiling joist (20b) would be involved also, as is set forth in more detail below. In both structures (10a) and (10b) are found the typical 2"×4" wall studs (24). Flooring (26) is illustrated in FIG. 1B. Roof (28) completes the typical building structures as illustrated in FIGS. 1A and 1D.

To reinforce such structures so as to better enable them to withstand the forces generated by high winds, applicant provides tie rod (30) anchored to anchor bolt (17) and to foundation (16). Tie rods (30) trend vertically and are parallel to and coplanar with (laying within) stud walls (12), (14a) and (14b). Tie rods (30) have a socket end (female) (30a) having walls defining a threaded socket. A second end of tie rod (30) is defined by threaded end (30b) (see FIG. 1B).

Tie rod (30) is typically rigid, between ½" and ⅝" in diameter, and made of corrosion-resistant steel. The socket end is dimensioned to threadably receive threaded end (17b) of anchor bolt (17) or threaded end (30b). Threaded end (30b) of tie rod (30) is dimensioned to receive either of socket end (30a) or washer (32) and nut (34). Washer (32) is defined to fit snugly over anchor bolts (17) and the shaft of rigid tie rod (30), and is generally made of ⅛" thick metal, about 3½" on a side, and square.

Turning now to FIG. 1A, it is seen that tie rod (30) of applicant's present invention is designed to secure the walls (14a) and (14b) with respect to foundation (16). Simply put, tie rods (30) will, when used according to applicant's present invention, tend to resist any tensile forces tending to lift or separate walls (14a), (14b) or roof (28) from structures (10a) and (10b), achieving this result by anchoring the walls (14a) and (14b) to the foundation by the use of washers (32) secured in place by tie rods (30) and nuts (34) against horizontal beams.

As can be further seen in FIGS. 1A and 1D, the present method calls for anchoring walls (14a) and (14b) at every third or fourth stud wall gap (36) defined by adjacent studs (24) and typically 16" wide.

FIGS. 1B and 1C provide further details on how coupling of tie rod end (30b) of first floor tie rod (30) engages the top surface of second floor joists (22) securing washer (32) snugly against a 2×4 or other means defining horizontal beams or floor joists (22). As can be seen in FIGS. 1B and 1C, channel (36) is required through the joists and is created by tools and methods well known in the trade.

Figure 2B:
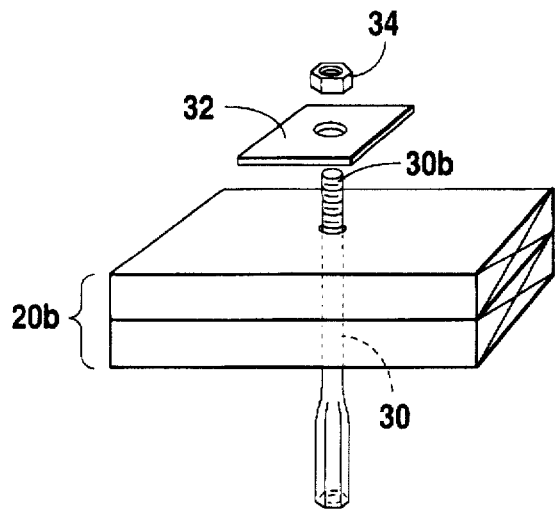
FIG. 2B is a symmetric detailed view of the method of anchoring to the foundation the top flight or the second floor of the dwelling.

FIG. 2B illustrates the method of affixing threaded end (30b) to an anchored tie rod (30) by securing with nut (34) and washer (32) to threaded end (30b) at the top surface of ceiling joist (20b).

FIG. 2A illustrates a wall section through a two-story building where the first story is constructed of concrete block and the second story is wood frame. While the details of applicant's method differ slightly when applied to building structure (10c), the function is still the same—to tie, through the use of vertical tie rods (30b), to the anchor bolt (17) of the foundation and to ceiling joist (20b) or other horizontal beam. Building (10c) has a concrete wall (38) defining first floor (39). At the top of first floor (39) is C.M.U. lintel bond beam (40). Anchor stud (18) is secured to bond beam (40). On top of the anchor stud (typically 2"×4") are located floor joists (42), typically 2"×12". Three-quarter inch plywood subfloor (44) and 2"×4" bottom plate (46) complete the partition between first floor (39) and second floor (41).

Figure 2C:
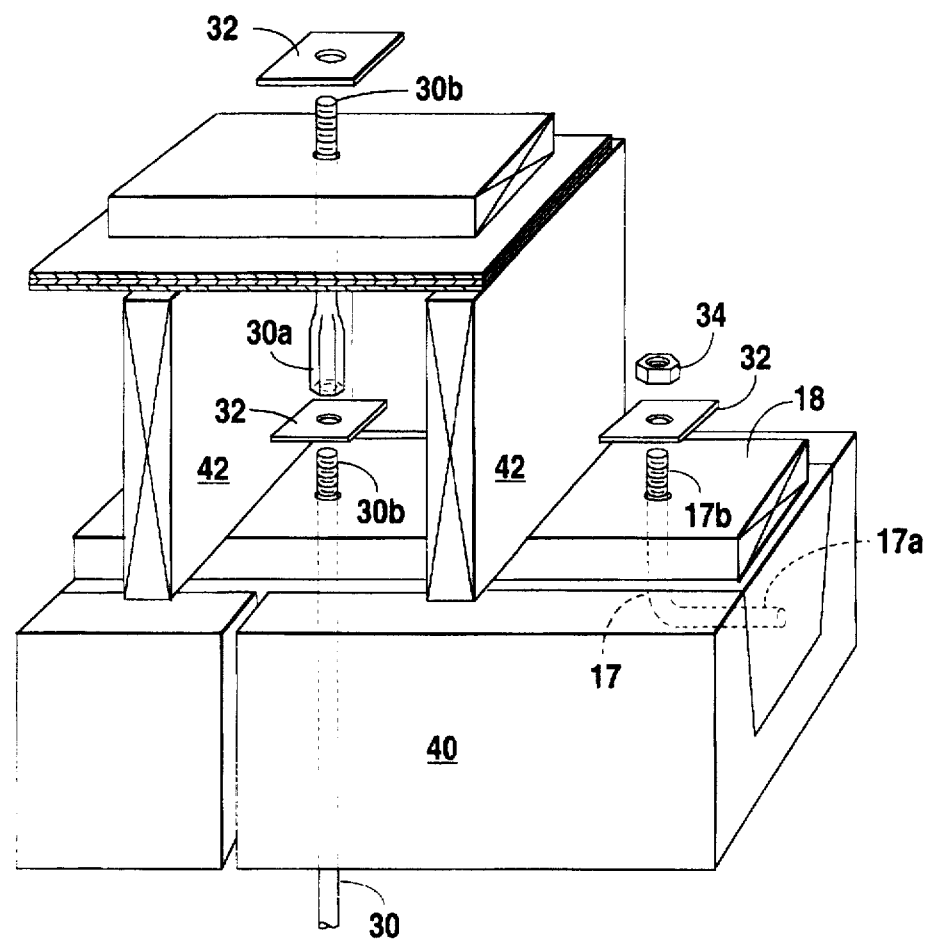
FIG. 2C is a symmetric detailed view of the second floor anchoring.

Turning now to the details of applicant's method, as set forth in FIGS. 2A and 2C, it can be seen that anchor bolts may be secured to either concrete foundation (16) or through bond beam (40), or at both locations. Tie rod (30) is anchored to anchor bolt (17). To accommodate the tie rod, a channel is created through concrete block wall (38) by means known in the trade to extend through anchor stud (18).

A short tie rod (30) may be used to extend between the upper and lower surfaces of the floor joist (42). This short rod (30) ties the top of bottom plate (46) where washer (32) and end (30a) of the second floor tie rod (30) begins, to concrete foundation (16) through the first floor tie rod. The second floor tie rod (30) has end (30b) extending through second floor ceiling joist (20b) as illustrated in FIGS. 2A and 2B. It is seen how using vertical tie rods from foundation (16) through second ceiling joist (or other horizontal beam) (20b) provides a means of ensuring tensile force along the set of tie rods defined at numeral (47) to the foundation of the structure. Specifically, it is seen how tie rods of several different lengths can be joined together to maintain or increase the tension of the building structure to the concrete foundation.

The length of tie rod (30) varies between 8' 1¾", and 1' 3". Typical sizes are 8" 1¼", 4' 2⅞", 2' 3¾", and 1' 3". These lengths correspond typically to the usual height differences between concrete foundation (16) and first and second story floor joist as well as differences between top and bottom of floor joists. Regardless of the length of tie rod (30), they are typically manufactured from ½" to ⅝" round steel. Socket end (30a) as well as threaded end (30b) typically have about 2" of thread. The longest rods, those over 4' 2⅞" in length, should have ⅝" thick shafts.

Figure 3A:
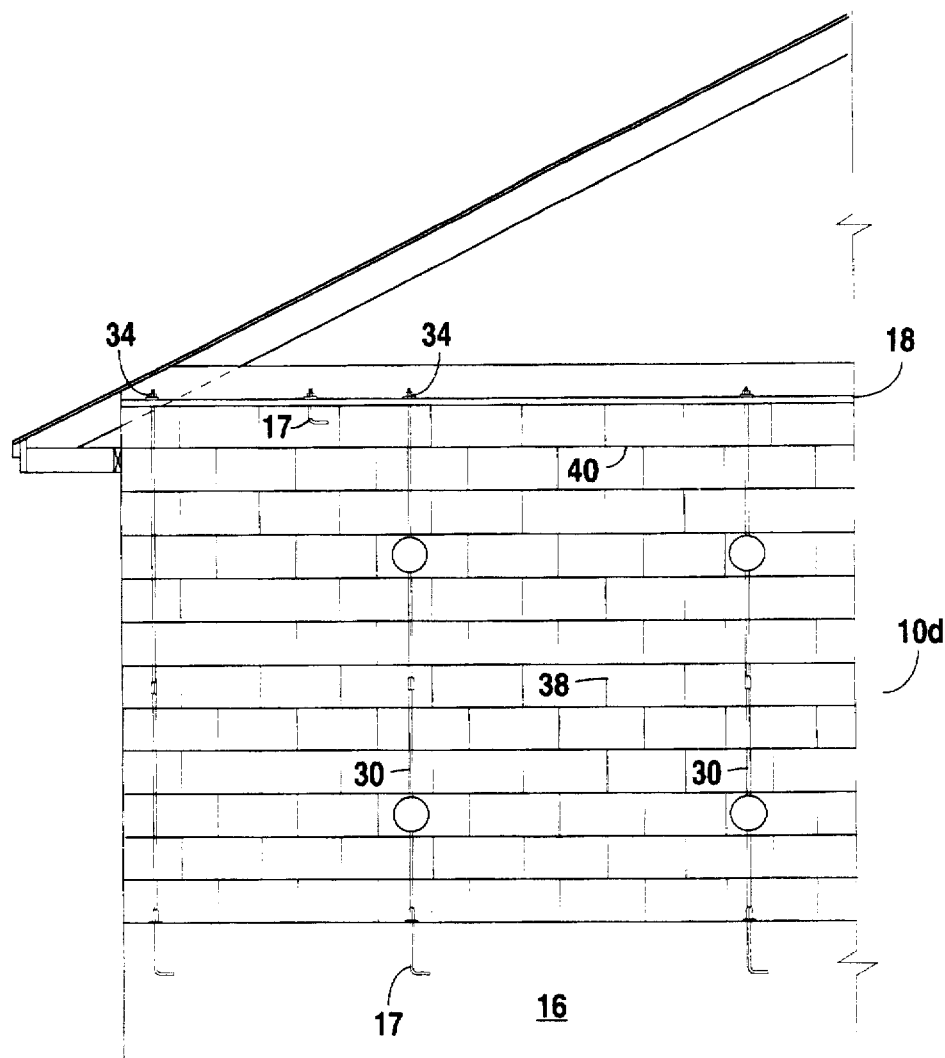
FIG. 3A is a side elevational view cut-away of a wall section of a concrete block wall building structure.
Figure 3C:
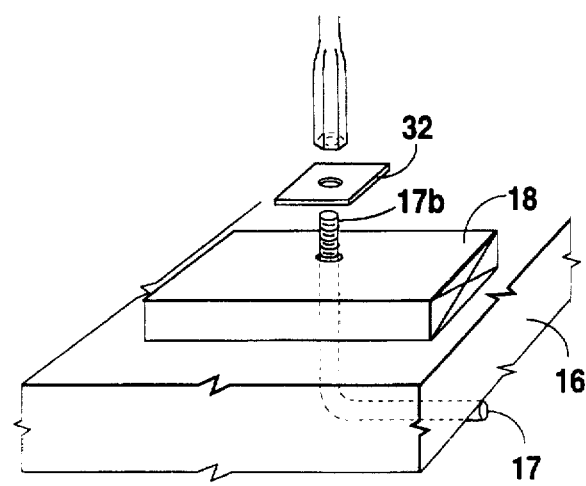
FIG. 3C is a symmetric view of anchored detail of a concrete slab.
Figure 3B:
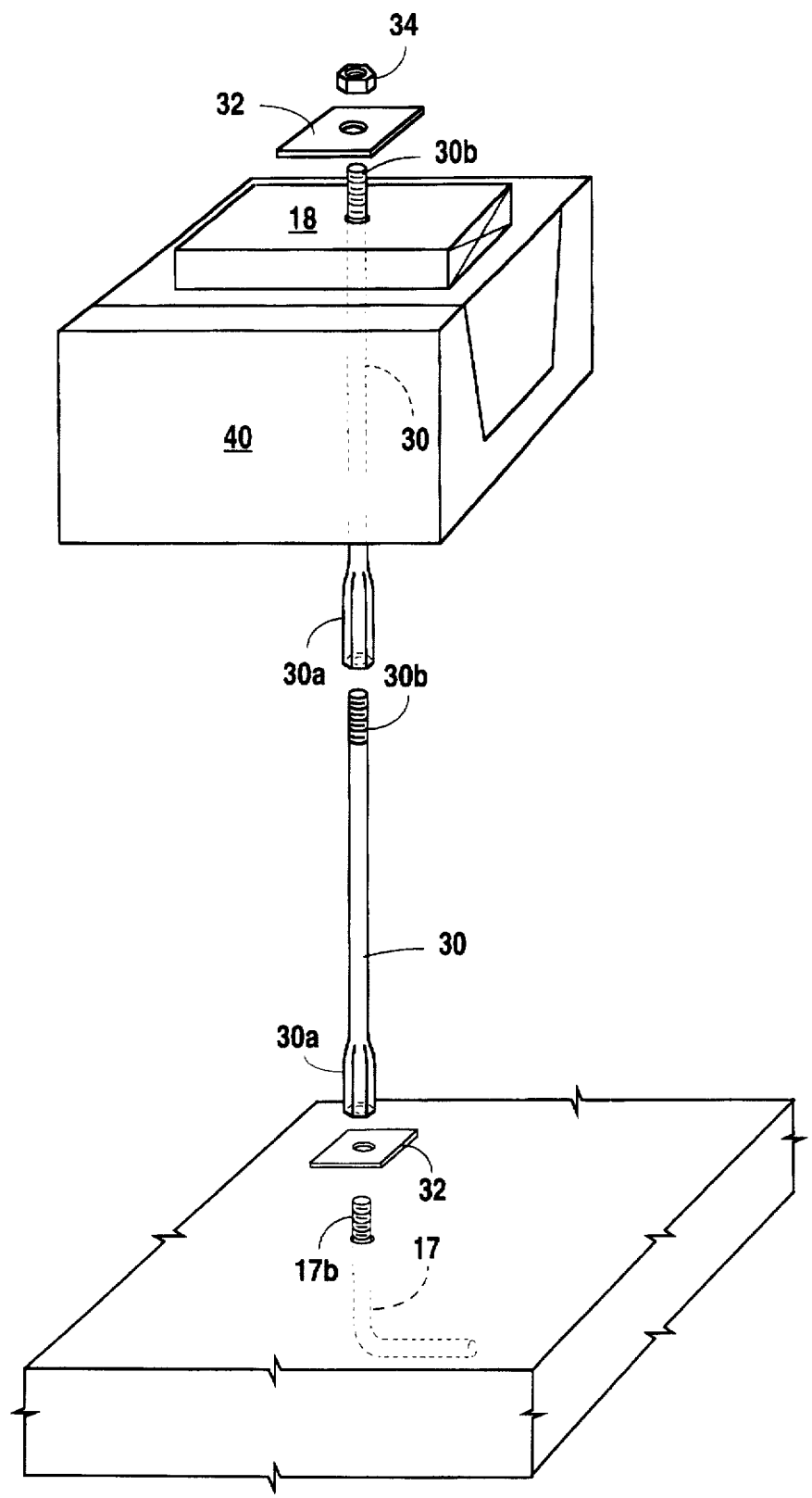
FIG. 3B is a symmetric detailed view of the masonry lintel.

Turning now to FIG. 3A, a one-story concrete block wall of building (10d) is illustrated. As can be seen here, installation and use of tie rod (30) is similar to that illustrated in FIG. 2A. That is, tie rod (30) is tied to foundation (16) at anchor bolt (17). Tie rod (30) is aligned vertically upward through concrete block wall (38) until threaded end (30b) extends above anchor stud (18) where it is affixed with the washer and nut as set forth above. Details of the tie rod installation may be seen at FIG. 3B as well as referring back to FIG. 2C. These details reveal that use of tie rod (30) with a single story concrete bock wall building structure as illustrated (10d) will provide for tensile forces anchored to foundation (16).

Figure 4A:
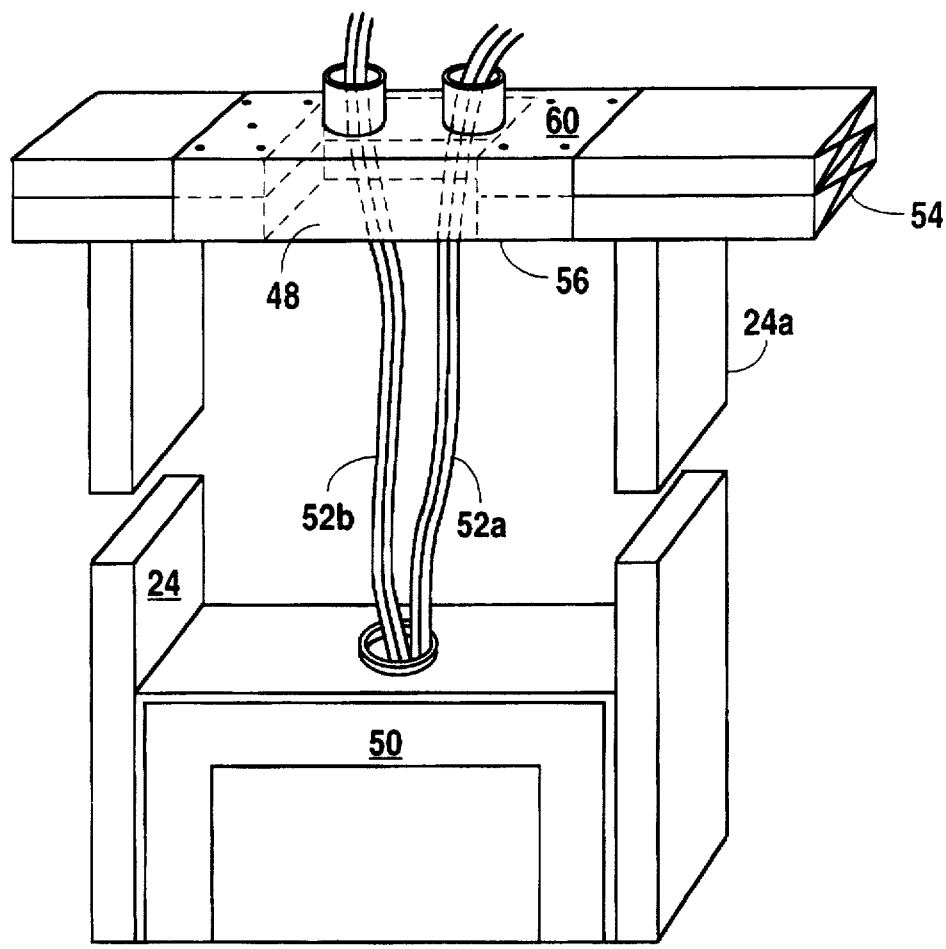
FIG. 4A is a symmetric detailed view of a brace for a cutout top plate of applicant's present invention.
Figure 4B:
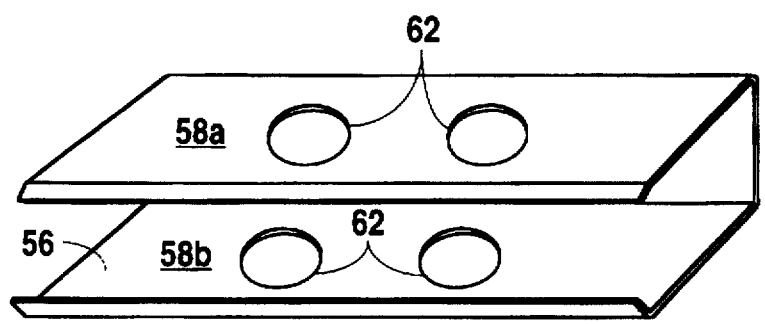
FIG. 4B is a symmetric detailed view of the brace of applicant's invention as shown in FIG. 4A.

FIGS. 4A–D, on the other hand, illustrate modifications to the wooden structures which utilize applicant's present invention to help strengthen the wooden structure from destruction in the event of high wind. More particularly, FIGS. 4A and 4B illustrate the use of a brace for a top plate having cutout (48). These cutouts are frequently required when an electrical panel box (50) is located between studs (24). Cutout (48) is provided to allow electrical conduit (52a) and (52b) to extend past horizontal beams and throughout the house. Unfortunately, cutouts (48) produce a material weakness in horizontal beams (54), top plates, joists or any type of beam. Thus, applicant provides a plate brace (56) to help strengthen the cutout beams (54). As can be seen in FIGS. 4A and 4B, brace (56) is shaped from 12 gauge metal plate, typically zinc or galvanized metal or the like, to form a generally C-shaped outline. Surfaces (58a) and (58b) are designed to extend across and past cutout (48) well into the solid wood portion of beam (54). Brace (56) can be secured to beam (54) by means of nails, screws or the like (60). It will be appreciated from FIGS. 4A and 4B that the dimensions of brace (56) in relation with the beam is designed to substantially enclose the cutout (48) of beam (54) while providing holes (62) for conduits (52a) and (52b) to run through. Again, the function of brace (56) is to strengthen the horizontal beams from separation under tensile, shear or compressive forces.

Figure 4C:
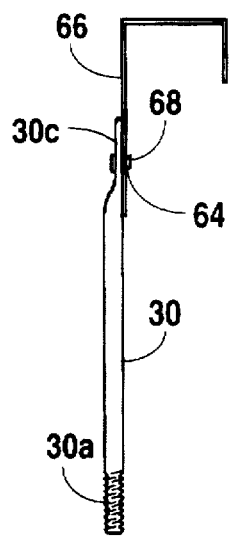
FIG. 4C is a side elevational view of an alternate method for attaching the tie rod to a roof joist.
Figure 4D:
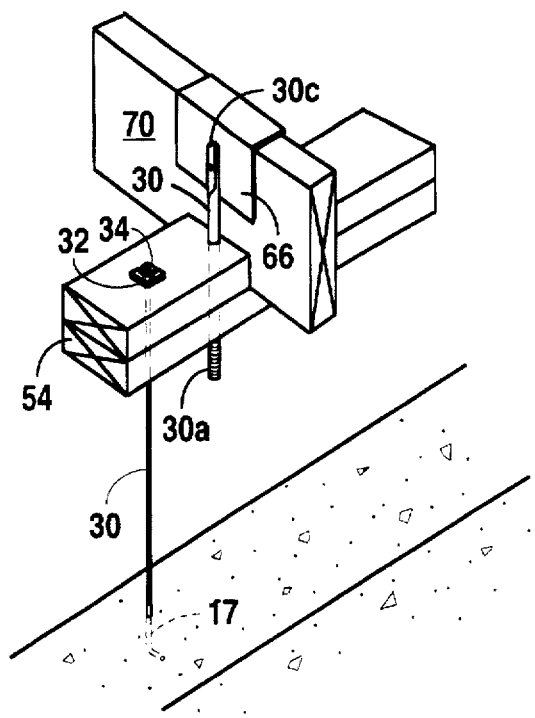
FIG. 4D is a symmetric detailed view of the alternate method for attachment shown in FIG. 4C.
Figure 4E:
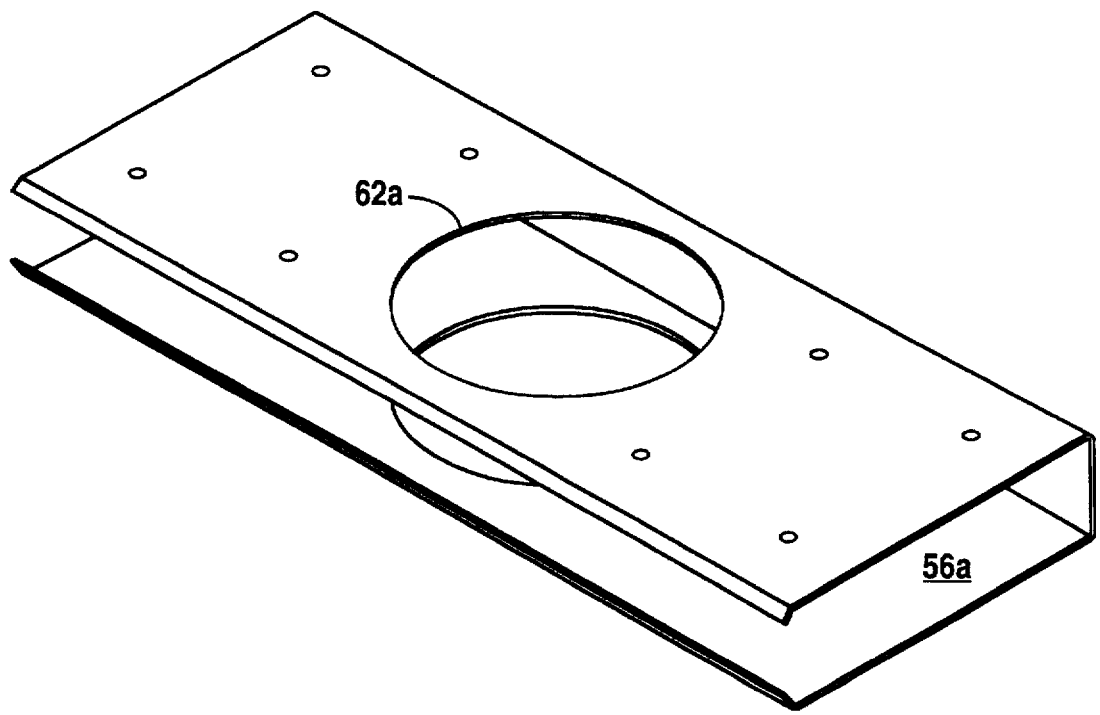
FIG. 4E is a symmetric detailed view of brace for a single hole cutout top plate of applicant's present invention.

FIG. 4E discloses another brace (56a) with only a single hole (62a) therein for use typically with plumbing pipe, where 2×4's or other wood pieces are cut out.

Other adaptations of applicant's tie rod (30) may be seen in FIGS. 4C and 4D. In the embodiment featured in FIGS. 4C and 4D, removed (nonanchored) end of tie rod (30) is modified to provide for a flattened portion (30c) in place of threaded end (30b). Flattened portion (30c) has channel (64) therethrough and is provided with a support bracket or flange (66) in the-shape of an inverted "J" which will attach to flattened portion (30c) with pin (68) or other fastening means. Turning back to support bracket or flange (66), it is seen in FIG. 4D how the tie rod (30) having flattened end portion (30c) coupled through support bracket or flange (66) may fit over a rafter (70) or floor joist or the like to provide resistance to tension forces. Thus, tie rod (30) can tie into rafters (70) through the use of a support bracket or flange (66) rather than the washers and nuts disclosed above. FIG. 4D illustrates a roof joist anchored to horizontal beam (54); however, the tie rod joining the roof joist may pass directly down to a foundation anchor bolt Applicant's method is applicable to any building structure. It provides for a multiplicity of vertical tie rods anchored at a first end to the foundation of the building. The removed end is anchored in any horizontal beam with a washer and a nut, to prevent vertical separation when the second beam undergoes tension forces or is tied into the roof joists or floor joists or any other suitable beam. The tie rods should lie in the planes of the walls. Torque on the securing bolts (or support braces) should not load up the structure under compressive forces, but be merely snug.

FIG. 5A illustrates applicant's system of tying the roof into the remainder of the frame of the reinforced building structure. More particularly, FIG. 5A illustrates the manner in which a roof, typically pitched, having joists or rafters (70) is secured to horizontal beams (54) of the frame. This is done through the use of tie rods (30) of various suitable lengths which at a first end (30b) are threaded for receipt of a washer or washers and a nut thereon, to be secured to a horizontal beam (54) or other typically horizontal frame member of the building, or tied directly into the anchor bolts of the foundation through the use of socket end (30a) attached to the anchor bolts. That is, the appropriate frame members are drilled out to snugly except threaded end (30b) of the tie rods therethrough or for allowing the tie rod to pass through down to the foundation anchor bolts.

It can be seen by viewing FIGS. 4D and 5A that the roof of a house may be secured both along roof rafters (70) through the use of J-shaped support bracket or flange (66), typically pivotally or rigidly mounted to flattened end (30c) of tie rod (30) to a ridge beam (72) of the roof.

Figure 5B:
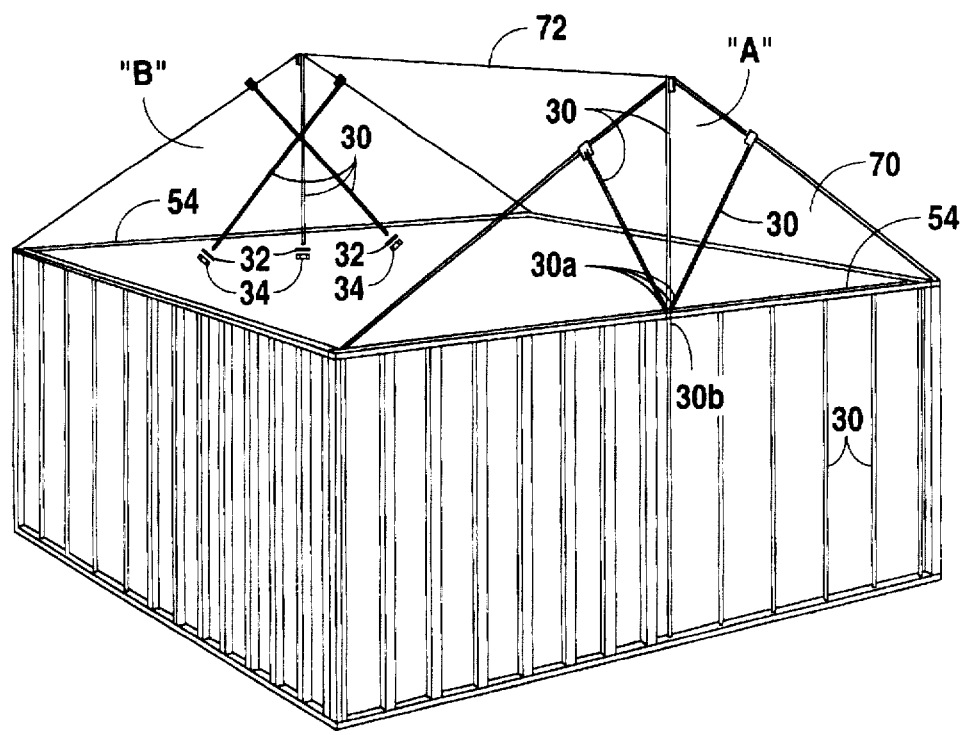
FIG. 5B is a symmetric view of two alternate methods of the present invention for tying the roof into the reinforced building structure.

FIGS. 4D, 5A and 5B also illustrate the manner in which the tie rods can secure the roof rafters and/or ridge beam in a manner in which the roof becomes tied into, typically, a horizontal load bearing beam (54) (typically a ceiling joint) which, in turn, is tied into the anchor bolts of the foundation by the use of tie rods beginning at the anchor bolts and secured to the top of a horizontal beam (54).

Figure 5C:
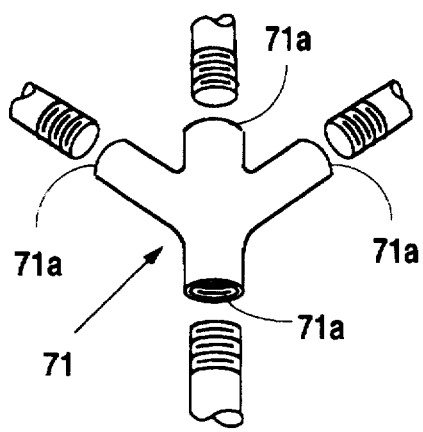
FIG. 5C is a symmetric view detailed view of the multiple tie rod receiving bracket of applicant's present invention.

With reference to FIG. 5C, it is noted that the roof rafters and/or ridge beam can tie directly into one another through tie rods and a bracket (71) having tie rod receiving sockets (71a) (for receiving roof rafter and/or ridge beam tie rods) which will, at socket (71b), receive a threaded end (30b) of a tie rod going vertically downward to an anchor bolt; note option "A" in FIGS. 5B and 5C.

Thus, forces tending to blow, lift off or collapse a roof of a building structure are resisted by tie rods (30) subject to tension and other loads transmitted from the roof to horizontal beam (54) which, through the system of tie rods previously illustrated, is anchored to foundation (16). It is noted that support bracket or flange (66) is typically mounted to flattened end portion (30c) of tie rod (30) so it may be pivoted. In the alternative, it may be welded such that support bracket or flange (66) is rigid with respect to tie rod (30). The tie rod/flange combination is typically used just adjacent to the juncture of the vertical wall and the roof rafter (70) (that is, at each end of the roof as illustrated in FIG. 5B). In addition, it is seen that the use of tie rod/flange combination may be used anywhere else along the roof rafter between the junction of the roof rafter with the vertical wall and the peak of the roof.

FIG. 5A also illustrates how a tie rod may be secured directly through a roof rafter through the use of an end portion (30d) modified to accept a bolt (35) therethrough, transverse to the longitudinal axis of the rod and securing end (30d) to the roof joist with nut (34) and a washer. Such an arrangement would be more conducive to transmitting compressive forces, especially when nut/washer combinations secure threaded end (30b) to both the top and bottom surfaces of horizontal beam (54).

FIG. 5B also illustrates two optional variations or patterns of tie rod/roof rafter installation, one option at end "A" of the building structure illustrated, the other at end "B". Option "A" utilizes bracket (71) to tie together a multiple of rods whose ends secure roof joists (70). Option "B" provides for the removed ends of the roof securing rods to tie separately into horizontal beam (54). While both options are illustrated on one roof, the preferred embodiment provides that a given building structure use one option or the other, but not both together.

It is further noted that option "A" in FIG. 5B provides tying in multiple ends (30a) to one location along horizontal beam (54), thus localizing any forces transmitted by the roof rafter tie rods (30). Option "B" set forth in FIG. 5B spreads the forces transmitted by the roof rafter tie rods along the horizontal beam.

The illustration also shows the use of ½" O.D. steel rods along the walls of the building structure at 24" O.C. with the studs at 16" O.C. typically, but with some removed for clarity in illustrating the tie rods. The roof rafter rods may also tie into interior walls, where feasible, especially if the interior wall is load bearing.

Figure 5D:
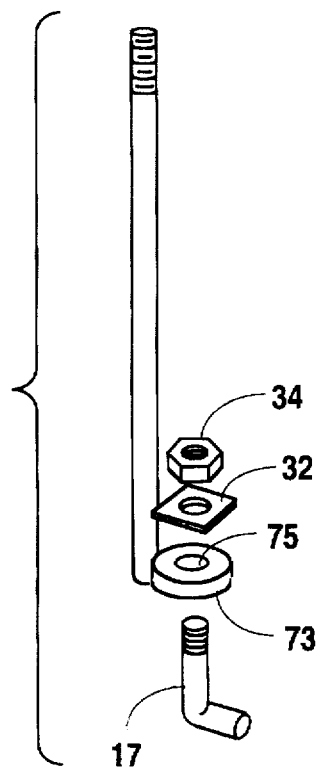
FIG. 5D is a symmetric detailed view of an alternate tie rod configuration of applicant's present invention.

FIG. 5D illustrates an alternate preferred embodiment of a tie rod end having a standoff (73) adjacent the longitudinal axis of the tie rod, the standoff having a hole (75) for accepting anchor bolt 17 (or a threaded end) therethrough. Nut (34) and washer (32) secure the rod.

Figure 6:
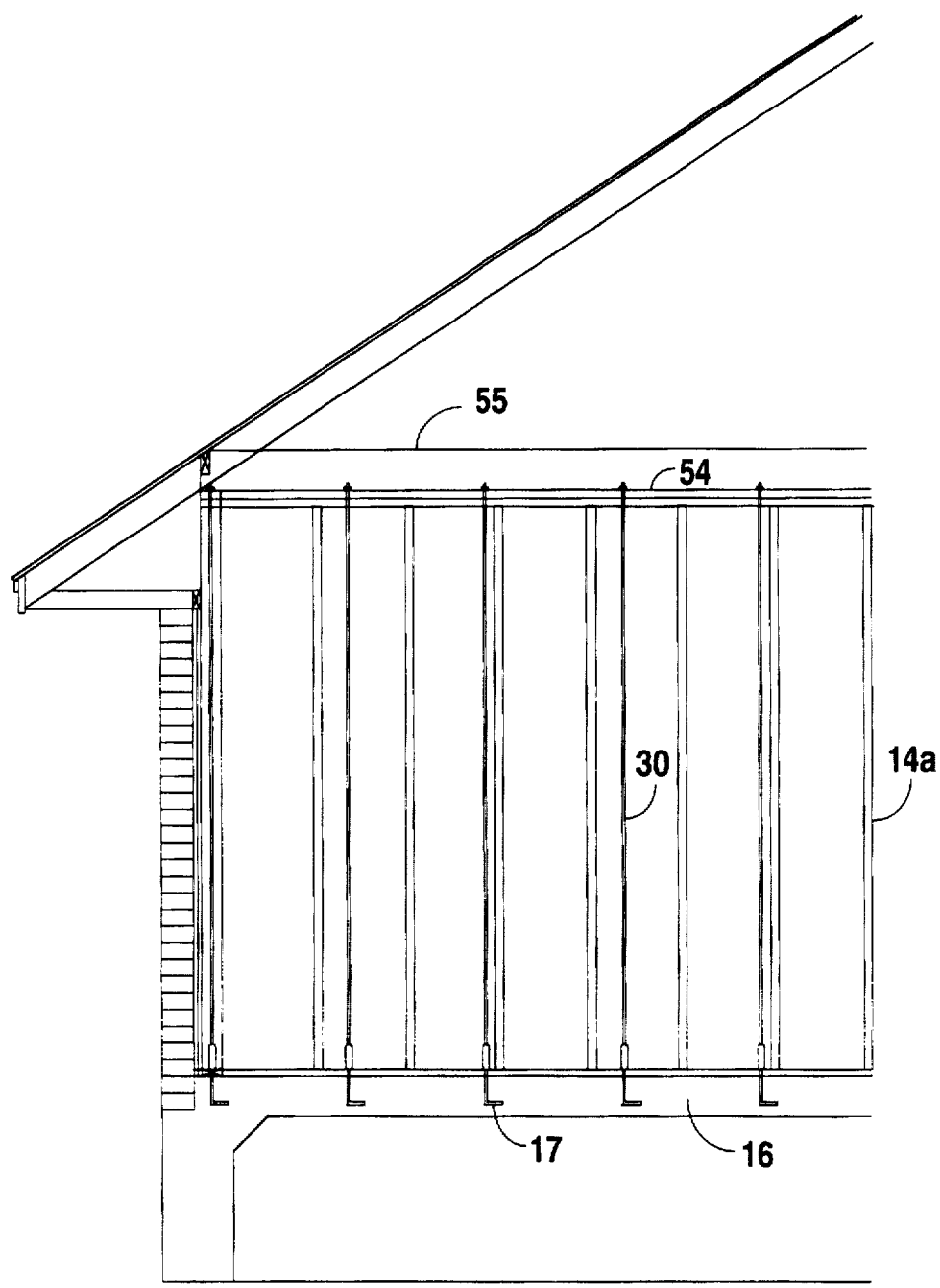
FIG. 6 is a side elevation cutaway view of the method of applicant's present invention for a one-story dwelling.

FIG. 6 illustrates a portion of a wooden structure having a brick and wood stud wall, typically 9½" thick, made with 2×4 wood studs at 16" O.C. topped by horizontal beam (54) and vertically oriented 2x6 ceiling joists (55) at about 16" O.C. As seen in FIG. 6, ½" steel rod extensions tie anchor bolts (17) to horizontal beam (54) and are spaced at about 2' O.C. for external walls (about 3' O.C. for internal walls). Thus, the concrete foundation is tied directly to the horizontal beam (54) to help prevent collapse or destruction of the walls and building structure.

Figure 7:
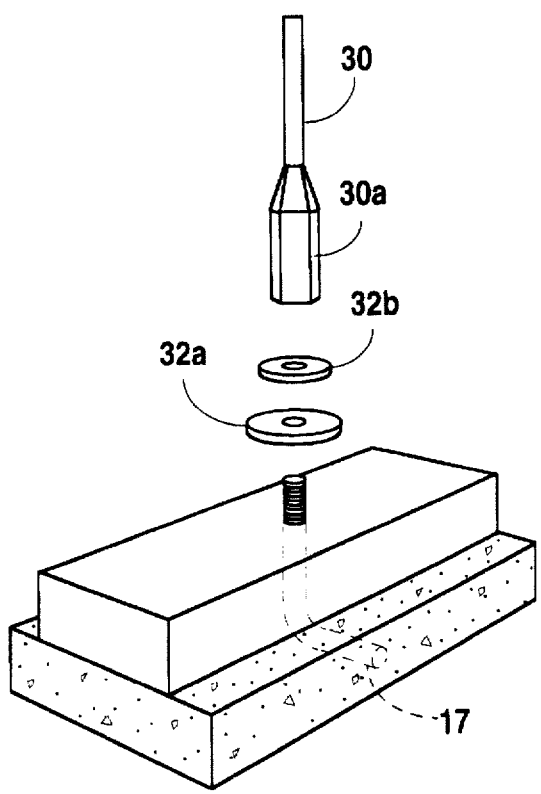
FIG. 7 is a symmetric detailed view of the anchoring method of applicant's present invention.

In FIG. 7, it is seen that anchor bolts (17) may tie into socket end (30a) of tie rods (30) through the use of a multiplicity of round washers, here 2" diameter washer (32a) and 1½" diameter washer (32b) to help spread the loads from the rods and anchor bolts to the beams.

Figure 8:
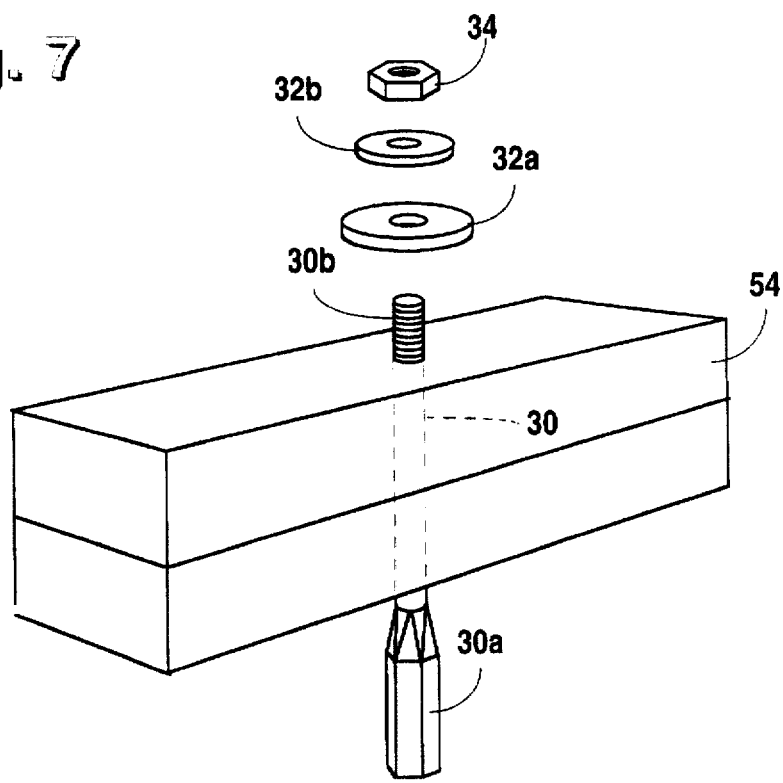
FIG. 8 is a symmetric detailed view of the method of attachment to a top plate or horizontal beam of the present invention.

FIG. 8 illustrates the use of wall tie rods extending through a pair of horizontal 2×4's representing a typical top plate or horizontal beam and tied with a 2" washer (32a) and 1½" washer (32b) along with a snugly tightened ½" nut (34) to secure tie rod (30) to beam (54).

Figure 9:
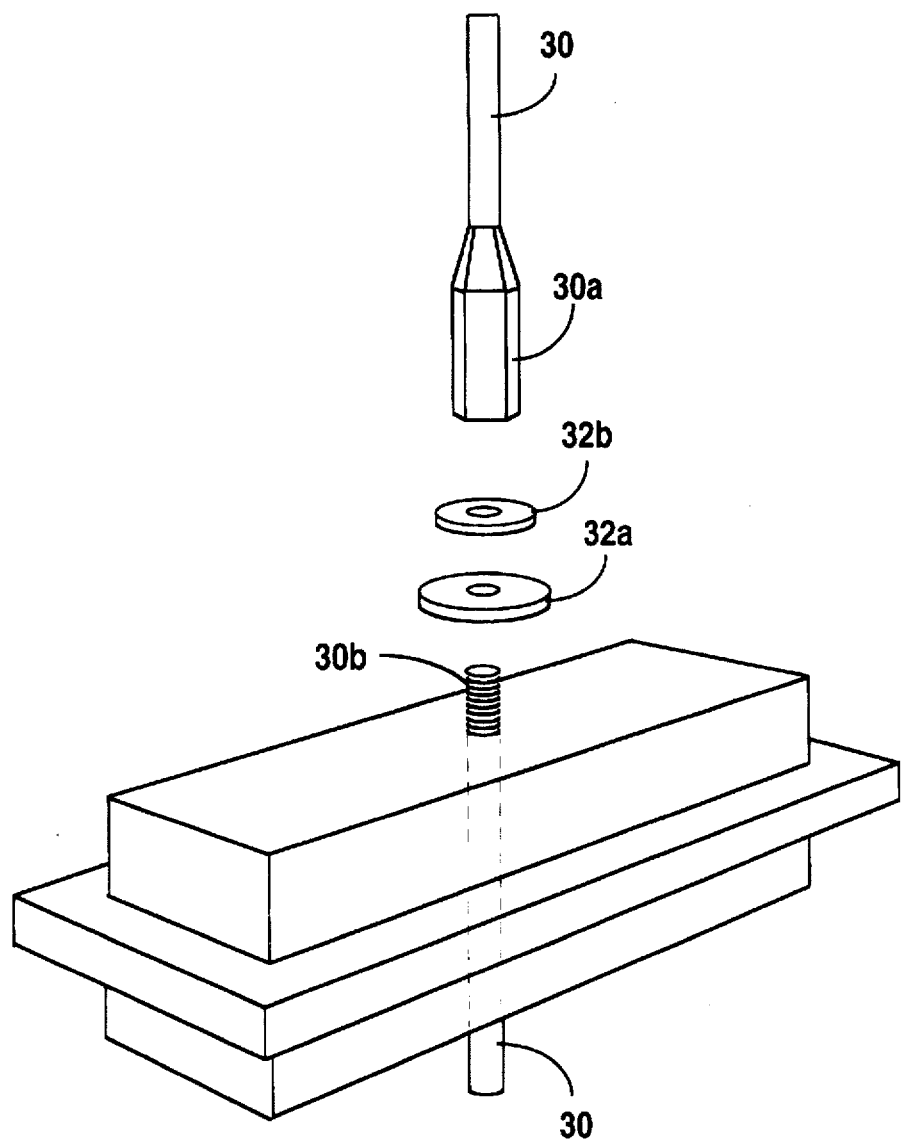
FIG. 9 is a symmetric detailed view of the method of applicant's present invention for attachment through a floor structure.

FIG. 9 illustrates the manner in which tie rods can tie together vertically through the use of socket ends (30a) tied to threaded end (30b) of two longitudinally aligned tie rods and the use of a multiplicity of washers, here (32a) and (32b). Note the washers are of differing outer diameters, typically the larger diameter laying flush and snug against the horizontal beam and the small diameter washer overlaying the large diameter washer, as illustrated in FIG. 9. FIG. 9 also illustrates the manner in which tie rods can extend through ¾" flooring to help stabilize the floor structure, especially when it is sandwiched by 2×4's, as illustrated in FIG. 9.

Uplift tests were performed, comparing applicant's system (hereinafter known as the "Ramirez Hurricane Protection System") with an approved hurricane clip. The objective of the program was to evaluate the structural performance of the Ramirez Hurricane Protection System for acceptance by the Southern Building Code Congress International.

TEST 1—Top Plate Uplift

The Ramirez Hurricane Protection System was constructed according to the specifications set forth herein and utilized a half-inch diameter steel rod embedded at each end. The bottom steel rod was screwed onto an anchor bolt cast in concrete, and the top of the steel rods used a nut and washer fastening to attach to the top plate.

Figure 10A:
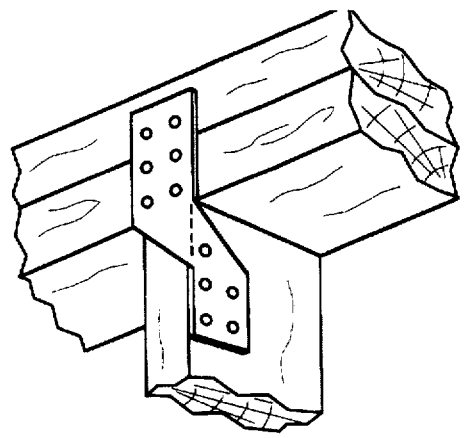
FIG. 10A is a symmetric view of a prior art approved hurricane clip for wall studs and top plate connection.

The approved hurricane clip utilized a 0.041" thick steel clip, as shown in FIG. 10A. The clip was used with five nails to attach the clip to the wall stud and six nails to attach the clip to the top plate.

Two uplift tests were performed on standard construction housing wall units. The first test used a 9.33' wide by 8' tall wall constructed using the approved hurricane clip. The second test was on an identical wall using the Ramirez Hurricane Protection System.

The wall used in this first test was constructed with 2×4 studs on 16" center-to-center spacing. The approved hurricane clips were used at the top and bottom of every other stud. This is "standard" housing construction practice. The nails were driven by hand using a hammer. The exterior face of the wall was covered by 0.25" thick plywood sheathing.

A hydraulic jack was used to apply an uplift load at the center of the wall. Deflections of the top plate were measured using three linear potentiometers supported by a separate frame above the wall. The linear potentiometers were located at the center of the top plate and the quarter points.

The load was applied at a constant rate until the top plate failed, and connections between the top plate and the studs failed. The failure of the connection consisted of the nails used to connect the approved hurricane clip pulling out of the top plate. The failure was along the entire length of the top plate. The maximum load applied to the top plate was 3,980 pounds.

The wall used to test the Ramirez Hurricane Protection System was 9.33' wide by 8' tall with 2×4 studs on 16" center-to-center spacing. Rods having 0.6251" diameter were used at 2' center-to-center spacing, as a recommended installation for exterior walls. No approved hurricane clips were used on the test wall. The exterior face of the wall was covered with 0.25" plywood sheathing.

A hydraulic jack was used to apply an uplift load at the center of the wall. Deflections of the top plate were measured using three linear potentiometers supported by a separate frame above the wall. The linear potentiometers were located at the center of the top plate and the quarter points.

Load was applied at a constant rate until the top plate failed. The failure of the top plate consisted of top plate wood cracking. The failure was localized at the part of the top plate that was loaded, rather than along the entire length of the top plate. The maximum load applied to the top plate was 12,210 pounds.

Test 2—Roof Rafter Uplift

Three roof rafter uplift tests were performed on standard construction housing rafter units. All three tests used a 10' wide by 4' tall rafter with different construction methods used in fabricating the rafter. One system used the hurricane clip, another the Ramirez Hurricane Protection System, and the third system did not use any reinforcement of any kind.

Figure 10B:
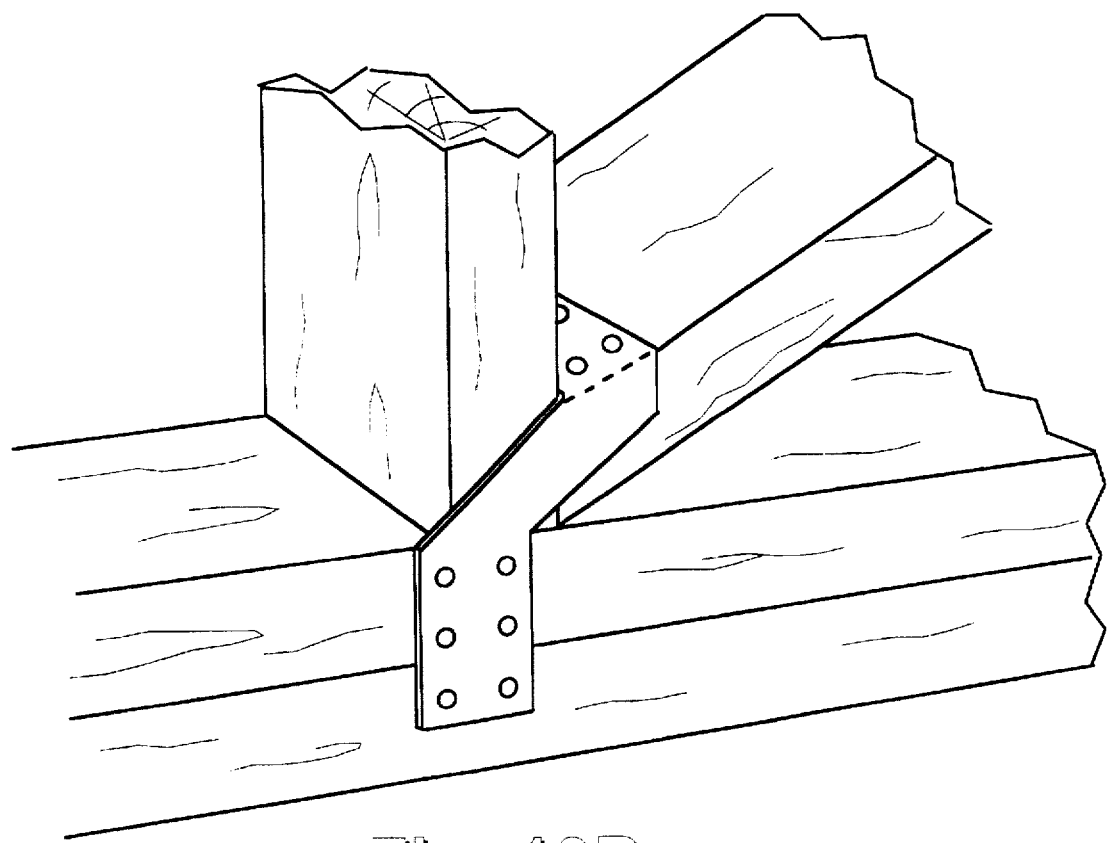
FIG. 10B is a symmetric view of a prior art approved hurricane clip for rafter and top plate connection.

The rafter using the hurricane clip as well as the Ramirez Hurricane Protection System in standard construction was a 10' wide by 4' tall roof rafter using 2×6" lumber on a 4 vertical to 5 horizontal slope. The hurricane clips were used to attach the rafter to the wall top plate as shown in FIG. 10B.

A hydraulic jack was used to apply an uplift at the center 32" of the roof rafter. Deflections of the top plate were measured using five linear potentiometers supported by a separate frame above the wall. The linear potentiometers were located at the center of the rafter, at quarter points, and at the ends. The load was applied at a constant rate until the system failed. Maximum load applied to the hurricane clip system was 2,600 pounds; the Ramirez Hurricane Protection System had a maximum applied load of 7,680 pounds; and the roof rafter system without any strengthening at all failed at 1,720 pounds.

The summary of the results are included in Table I below.

TABLE 1

| Test | Construction | Maximum Load (Pounds) | Deflection at Maximum Load (Inches) |
|---|---|---|---|
| Top plate uplift | Hurricane clip | 3,980 | 1.69 |
| Top plate uplift | Ramirez Hurricane Protection System | 12,210 | 2.69 |
| Roof rafter uplift | Hurricane clip | 2,600 | 0.53 |
| Roof rafter uplift | Ramirez Hurricane Protection System | 7,680 | 0.59 |
| Roof rafter uplift | Standard construction | 1,720 | 1.07 |

In summary, the Ramirez Hurricane Protection System provides significant advantages over the known systems. The test results illustrate substantial strength ening of wooden frame structures using the unique method and tie rods.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. An assembly for securing a roof of a wood frame building structure, the roof having a multiplicity of roof rafters, to a foundation of the building structure, the assembly comprising:

a first rigid metal tie rod having a first end securely fastened with the foundation of the wood frame building structure and a second end;

a first multiplicity of roof rafter engaging rigid metal rods, each having a first end and a second end;

a first bracket having means for connecting the second end of the first rigid metal tie rod to the first ends of each of the first multiplicity of roof rafter engaging rigid metal rods; and means to attach the second ends of the first multiplicity of roof rafter engaging rigid metal rods to the roof rafters of the wood frame building structure;

wherein a force tending to displace the roof from the building structure will be transmitted through the first multiplicity of roof rafter engaging rigid metal tie rods to the first rigid metal tie rod and down to the foundation to resist such displacement.

2. The assembly of claim 1 further comprising:

a second rigid metal tie rod having a first end securely fastened with the foundation of the wood frame building structure and a second end;

a second multiplicity of roof rafter engaging rigid metal rods, each having a first end and a second end;

a second bracket for connecting the second end of the second rigid metal tie rod to the first ends of each of the second multiplicity of roof rafter engaging rigid metal rods; and means to attach the second ends of the second multiplicity of roof rafter engaging rigid metal rods to the roof rafters of the wood frame building structure;

wherein a force tending to displace the roof from the building structure will be transmitted through the second multiplicity of roof rafter engaging rigid metal tie rods to the second rigid metal tie rod and down to the foundation to resist such displacement.

3. The assembly of claim 1 further comprising a first short threaded metal rod, adapted to be rigidly held in the foundation and vertically located with respect to the foundation of the building structure, the threaded metal rod adapted to accept, in axial alignment, the first end of the first rigid metal tie rod.

4. The assembly of claim 2 further comprising a second short threaded metal rod, adapted to be rigidly held in the foundation and vertically located with respect to the foundation of the building structure, the threaded metal rod adapted to accept, in axial alignment, the first end of the second rigid metal tie rod.

* * * * *